US012302074B2

(12) United States Patent
Borss

(10) Patent No.: US 12,302,074 B2
(45) Date of Patent: May 13, 2025

(54) APPARATUS AND METHOD FOR COMBINING REPEATED NOISY SIGNALS

(71) Applicant: Fraunhofer-Gesellschaft zur Foerderung der angewandten Forschung e.V., Munich (DE)

(72) Inventor: Christian Borss, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 255 days.

(21) Appl. No.: 18/183,560

(22) Filed: Mar. 14, 2023

(65) Prior Publication Data

US 2023/0217197 A1 Jul. 6, 2023

Related U.S. Application Data

(63) Continuation of application No. PCT/EP2021/075248, filed on Sep. 14, 2021.

(30) Foreign Application Priority Data

Sep. 18, 2020 (EP) .................................... 20196987

(51) Int. Cl.
*H04R 29/00* (2006.01)
*G10L 19/022* (2013.01)
(Continued)

(52) U.S. Cl.
CPC .......... *H04R 29/001* (2013.01); *G10L 19/022* (2013.01); *H04R 3/12* (2013.01); *H04S 7/301* (2013.01)

(58) Field of Classification Search
CPC . H04R 29/001; G10L 19/022; G10L 19/0208; G10L 19/0204; G10L 2013/021; G10L 13/00
See application file for complete search history.

(56) References Cited

U.S. PATENT DOCUMENTS

| | | | | |
|---|---|---|---|---|
| 10,623,854 | B2 * | 4/2020 | Goesnar | H04R 3/005 |
| 11,646,047 | B2 * | 5/2023 | Villemoes | G10L 21/04 704/500 |

(Continued)

FOREIGN PATENT DOCUMENTS

| | | | |
|---|---|---|---|
| WO | 2011151771 | A1 | 12/2011 |
| WO | 2014132102 | A1 | 9/2014 |

OTHER PUBLICATIONS

Amir, A, et al., "Using Audio Time Scale Modification for Video Browsing", System Sciences, 2000. Proceedings of the 33rd Annual Hawaii International Conference on Jan. 4-7, 2000, Piscataway, NJ, USA, IEEE, Jan. 4, 2000 (Jan. 4, 2000), pp. 1117-1126, XP010545354, 10 pp.

(Continued)

*Primary Examiner* — Disler Paul
(74) *Attorney, Agent, or Firm* — Perkins Coie LLP; Michael A. Glenn

(57) ABSTRACT

An apparatus for combining three or more audio signals is described. The apparatus includes a segmentation block for segmenting each audio signal into segments, a weight determination block, which is configured to determine a weight value for each of the temporally weighted audio signal segments, a combination block for combining the temporally weighted audio signal segments of each audio signal, and a synthesis block for generating an output audio signal. A method for combining three or more audio signals and a computer program product are also described.

15 Claims, 5 Drawing Sheets

(51) Int. Cl.
*H04R 3/12* (2006.01)
*H04S 7/00* (2006.01)

(56) References Cited

U.S. PATENT DOCUMENTS

| | | | | |
|---|---|---|---|---|
| 2007/0265836 | A1 | 11/2007 | Funakoshi | |
| 2011/0099021 | A1 | 4/2011 | Zong et al. | |
| 2012/0010880 | A1* | 1/2012 | Nagel | G10L 21/038 704/E19.01 |

OTHER PUBLICATIONS

Sluijter, R.J., et al., "A Time Warper for Speech Signals", Speech Coding Proceedings, 1999 IEEE Workshop on Porvoo, Finland Jun. 20-23, 1999, Piscataway, NJ, USA, IEEE, US, Jun. 20, 1999 (Jun. 20, 1999), pp. 150-152, XP010345551, 3 pp.

* cited by examiner

APPARATUS AND METHOD FOR COMBINING REPEATED NOISY SIGNALS

CROSS-REFERENCES TO RELATED APPLICATIONS

This application is a continuation of copending International Application No. PCT/EP2021/075248, Sep. 14, 2021, which is incorporated herein by reference in its entirety, and additionally claims priority from European Application No. EP 20 196 987.0, filed Sep. 18, 2020, which is incorporated herein by reference in its entirety.

The invention is within the technical field of audio signal processing. Specifically, for combining repeated noisy signals.

Embodiments of the invention refer to an apparatus for combining three or more audio signals. Further embodiments refer to a method for combining three or more audio signals. Further embodiments refer to using the aforementioned. Further embodiments refer to a computer program product.

BACKGROUND OF THE INVENTION

This invention finds application for example in the field of loudspeaker calibration where measurements, such as exponential sweep measurements for example, are repeated for robust system identification. This kind of calibration is utilized in modern sound systems, for example soundbars and smart speakers.

When measuring the transfer function of a loudspeaker in an anechoic environment or in a reverberant room, the recorded signal, recorded for example via a microphone, which captures the test signal is degraded by additive noise. Especially non-stationary noise like clicks and pops, footsteps, slamming doors, or fluctuating background noise can be a problem in practice. Reducing this noise improves the accuracy of the measurement and by that leads to better calibration results.

Transfer function measurements with exponential sweep signals are widely used in practice due to their benefits over alternative methods like using maximum length sequences (MLS) as excitation signals. For practical reasons, such MLS measurements were often repeated to improve the signal-to-noise level. However, the repetitions could not get rid of artifacts caused by time-variances and non-linear distortions. This kind of artifacts can be further reduced by using different MLS sequences.

With the introduction of improved measurements, such as exponential sweep signals, repeated measurements were no longer needed and, in fact, using longer excitation signals instead of repetitions yielded higher precision.

To cope with click and pop noises in the recording, conventional techniques process the recorded signal (e.g. sweep signals) with click and pop de-noising algorithms of commercial audio editors or use windowing methods.

With the present disclosure, an improved technique for combining repeated noisy signals is presented. A practical method and an apparatus to achieve this is presented in the following.

SUMMARY

An embodiment may have an apparatus for combining three or more audio signals, the apparatus comprising: a segmentation block for segmenting each audio signal, which is configured to dissect each audio signal into a plurality of audio signal segments, each audio signal segment overlapping with adjacent audio signal segments a predetermined percentage of the audio signal segment length, wherein all dissected audio signals comprise corresponding audio signal segment borders, such that each 1st, 2nd, . . . , nth audio signal segment of all audio signals comprise the same length, the same start time and the same end time, and to apply an analysis window function to each of the audio signal segments to produce temporally weighted audio signal segments, a weight determination block, which is configured to determine a weight value for each of the temporally weighted audio signal segments, a combination block for combining the temporally weighted audio signal segments of each audio signal, which is configured to calculate a weighted average of all temporally weighted audio signal segments of each audio signal, using the determined weight value of each temporally weighted audio signal segment, and a synthesis block for generating an output audio signal, which is configured to apply a synthesis window function to the combined temporally weighted audio signal segments of each audio signal, and to perform an overlap-add method on the corresponding results of the synthesis window function.

Another embodiment may have a method for combining three or more audio signals, comprising: segmenting each audio signal, comprising dissecting each audio signal into a plurality of audio signal segments, each audio signal segment overlapping with adjacent audio signal segments a predetermined percentage of the audio signal segment length, wherein all dissected audio signals comprise corresponding audio signal segment borders, such that each 1st, 2nd, . . . , nth audio signal segment of all audio signals comprise the same length, the same start time and the same end time, and applying an analysis window function to each of the audio signal segments to produce temporally weighted audio signal segments, determining a weight value for each of the temporally weighted audio signal segments, combining the temporally weighted audio signal segments of each audio signal, comprising calculating a weighted average of all temporally weighted audio signal segments of each audio signal, using the determined weight value of each temporally weighted audio signal segment, and generating an output audio signal, comprising applying a synthesis window function to the combined temporally weighted audio signal segments of each audio signal, and performing an overlap-add method on the corresponding results of the synthesis window function.

Another embodiment may have a non-transitory digital storage medium having a computer program stored thereon to perform the method for combining three or more audio signals, comprising: segmenting each audio signal, comprising dissecting each audio signal into a plurality of audio signal segments, each audio signal segment overlapping with adjacent audio signal segments a predetermined percentage of the audio signal segment length, wherein all dissected audio signals comprise corresponding audio signal segment borders, such that each 1st, 2nd, . . . , nth audio signal segment of all audio signals comprise the same length, the same start time and the same end time, and applying an analysis window function to each of the audio signal segments to produce temporally weighted audio signal segments, determining a weight value for each of the temporally weighted audio signal segments, combining the temporally weighted audio signal segments of each audio signal, comprising calculating a weighted average of all temporally weighted audio signal segments of each audio signal, using the determined weight value of each temporally weighted audio signal segment, and generating an output audio signal, comprising applying a synthesis window function to the combined temporally weighted audio signal segments of each audio signal, and performing an overlap-add method on the corresponding results of the synthesis window function, when said computer program is run by a computer.

Embodiments of the present application refer to an apparatus for combining three or more audio signals. These audio signals are for example repeated measurements of a sound system. The apparatus comprises a segmentation block. The segmentation block segments each audio signal into audio signal segments. For this, each audio signal is dissected into a plurality of audio signal segments. The dissection is performed such that each audio signal segment overlaps adjacent audio signal segments with a predetermined percentage of the audio signal segment length. Of course, the first and last audio signal segment can only overlap unilaterally. The same segmentation is used for all audio signals, such that all dissected audio signals have corresponding segment borders, that is, each $1^{st}$, $2^{nd}$, . . . , $n^{th}$ audio signal segment of all audio signals have the same length, the same start time and the same end time. The segmentation block further is configured to apply an analysis window function to each of the audio signal segments. This can be performed for each audio signal segment of each audio signal individually. Thereby, each audio signal segment is transformed into a temporally weighted audio signal segment.

The apparatus further comprises a weight determination block, which is configured to determine a weight value for each of the temporally weighted audio signal segments. This can also be done individually for each temporally weighted audio signal segment of each audio signal.

The apparatus further comprises a combination block for combining the temporally weighted audio signal segments of each audio signal. This can be done individually for each audio signal. The combination is performed by calculating a weighted average of all temporally weighted audio signal segments of each audio signal, using the determined weight value of each temporally weighted audio signal segment.

The apparatus also comprises a synthesis block for generating an output audio signal. The synthesis block is configured to apply a synthesis window function to the combined temporally weighted audio signal segments of each audio signal, and to perform an overlap-add method on the corresponding results of the synthesis window function. Thereby the output audio signal is generated.

It has been found that the presented technique is beneficial, since its performance is greatly improved over known techniques.

According to one embodiment, the weight determination block can determine the weight values for the temporally weighted audio signal segments based on an estimated noise variance value for each of the temporally weighted audio signal segments, or on the basis of a calculation of a root mean square value of a corresponding difference signal for each of the temporally weighted audio signal segments.

Other alternatives are also possible.

It has been found that the weight determination on the basis of a noise variance estimation is the most efficient, but the calculation of the root mean square value of a difference signal is also efficient compared to the known techniques.

According to one embodiment the three or more audio signals are measurements for loudspeaker calibration, preferably one of sweep measurements, in particular preferably exponential sweep measurements, measurements using Maximum Length Sequences, and measurements using acoustic signals, in particular preferably measurements using music.

According to one embodiment the apparatus dissects the audio signals, such that in each audio signal all audio signal segments have the same length, all segments have the same overlap percentage, and/or the same analysis window function is applied to all audio signal segments.

It has been found that each of these can increase the performance of the technique.

According to one embodiment the overlap percentage is 50 percent, the analysis window function and/or the synthesis window function is one of a cosine function and a square root of a constant-overlap-add property window function, and/or the analysis window function and the synthesis window function are the same window function.

It has been found that each of these can increase the performance of the technique.

According to one embodiment the product of the analysis window function and the synthesis window function satisfies the constant-overlap-add property.

It has been found that this constraint is beneficial for the technique.

According to one embodiment such an apparatus can be used for calibration of sound systems.

Further embodiments refer to a method for combining three or more audio signals.

According to one embodiment a method for combining three or more audio signals comprises the following steps.

In the first step of the method each audio signal is segmented into audio signal segments. These audio signals are for example repeated measurements of a sound system. The segmenting comprises dissecting each audio signal into a plurality of audio signal segments. The audio signals are dissected such that each audio signal segment overlaps adjacent audio signal segments with a predetermined percentage of the audio signal segment length. Of course, the first and last audio signal segment can only overlap unilaterally. The same segmentation is used for all audio signals, such that all dissected audio signals have corresponding audio signal segment borders, that is, each $1^{st}$, $2^{nd}$ $n^{th}$ audio signal segment of all audio signals have the same length, the same start time and the same end time. In the first step an analysis window function is further applied to each of the audio signal segments. This can be performed for each audio signal segment of each audio signal individually. Thereby, each audio signal segment is transformed into a temporally weighted audio signal segment.

In the second step of the method a weight value for each of the temporally weighted audio signal segments is determined. This can also be done individually for each temporally weighted audio signal segment of each audio signal.

In the third step of the method the temporally weighted audio signal segments of each audio signal are combined. This can be done individually for each audio signal. The temporally weighted audio signal segments are combined by calculating a weighted average of all temporally weighted audio signal segments of each audio signal, using the determined weight value of each temporally weighted audio signal segment.

In the fourth step of the method an output audio signal is generated by applying a synthesis window function to the combined temporally weighted audio signal segments of each audio signal, and performing an overlap-add method on the corresponding results of the synthesis window function. Thereby the output audio signal is generated.

It has been found that the presented technique is beneficial, since its performance is greatly improved over known techniques.

According to one embodiment, the weight values for the temporally weighted audio signal segments are determined on the basis of determining a noise variance estimate value for each of the temporally weighted audio signal segments, or on the basis of calculating a root mean square value of a corresponding difference signal for each of the temporally weighted audio signal segments.

Other alternatives are also possible.

It has been found that determining the weight values on the basis of determining a noise variance estimation is the most efficient, but calculating the root mean square value of a difference signal is also efficient compared to the known techniques.

According to one embodiment the three or more audio signals are measurements for loudspeaker calibration, preferably one of sweep measurements, in particular preferably exponential sweep measurements, measurements using Maximum Length Sequences, and measurements using acoustic signals, in particular preferably measurements using music.

According to one embodiment each of the audio signals is dissected using the same length and/or the same overlap percentage for all audio signal segments, and/or the same analysis window function is applied to all audio signal segments.

It has been found that each of these can increase the performance of the technique.

According to one embodiment the step of dissecting is performed using an overlap percentage of 50 percent, the analysis window function and/or the synthesis window function is one of a cosine function and a square root of a constant-overlap-add property window function, and/or the analysis window function and the synthesis window function are the same window function.

It has been found that each of these can increase the performance of the technique.

According to one embodiment the analysis window function and the synthesis window function are chosen such that the product of the analysis window function and the synthesis window function satisfies the constant-overlap-add property.

It has been found that this constraint is beneficial for the technique.

According to one embodiment such a method can be used for calibrating sound systems.

Although some aspects of the present disclosure are described as features in connection with an apparatus, it is clear that such a description can also be viewed as a description of corresponding method features. Likewise, although some aspects are described as features in connection with a method, it is clear that such a description can also be viewed as a description of corresponding features of a device or the functionality of a device.

Further embodiments refer to a computer program product for implementing the method described above when being executed on a computer or signal processor.

These methods are based on the same considerations as the above-described apparatus.

However, it should be noted that the methods can be supplemented by any of the features, functionalities and details described herein, also with respect to the apparatus. Moreover, the methods can be supplemented by the features, functionalities, and details of the apparatus, both individually and taken in combination.

BRIEF DESCRIPTION OF THE DRAWINGS

Embodiments of the present invention will be detailed subsequently referring to the appended drawings, in which.

In the figures, similar reference signs denote similar elements and features.

DETAILED DESCRIPTION OF THE INVENTION

In the following, examples of the present disclosure will be described in detail using the accompanying descriptions. In the following description, many details are described in order to provide a more thorough explanation of examples of the disclosure. However, it will be apparent to those skilled in the art that other examples can be implemented without these specific details. Features of the different examples described can be combined with one another, unless features of a corresponding combination are mutually exclusive or such a combination is expressly excluded.

It should be pointed out that the same or similar elements or elements that have the same functionality can be provided with the same or similar reference symbols or are designated identically, with a repeated description of elements that are provided with the same or similar reference symbols or the same are typically omitted. Descriptions of elements that have the same or similar reference symbols or are labeled the same are interchangeable.

In the presented technique three or more audio signals are combined. The audio signals represent exemplary repeated noisy signals, which can be for example the repeated measurements of a sound system or an element thereof. As described before, for measuring of the transfer function of such an element, for example a loudspeaker, in an anechoic environment or in a reverberant room, the recorded signal, recorded for example via a microphone, which captures the test signal is degraded by additive noise.

The audio signals represent repeated measurements of the transfer function, i.e. the output of the sound element. Therein especially non-stationary noise like clicks and pops, footsteps, slamming doors, or fluctuating background noise can be detrimental to the measuring and thus have a negative effect on a calibration that is to be performed with the measurements. Such a calibration can be performed with consecutive measurements and following adjustment of sound parameters. Other calibration methods are also possible.

Reducing aforementioned noise improves the accuracy of the measurement and by that leads to better calibration results.

The repeated measurements, can for example be sweep measurements. It has been found that exponential sweep measurements are in particular useful. Alternative measuring techniques include measurements using Maximum Length Sequences and/or measurements using acoustic signals. It has been found that in particular music is a very unobtrusive acoustic signal for measuring the transfer function of a sound element. Such measurements are repeated a few times, wherein at least 3 repetitions are required for the presented technique.

Figure 1:
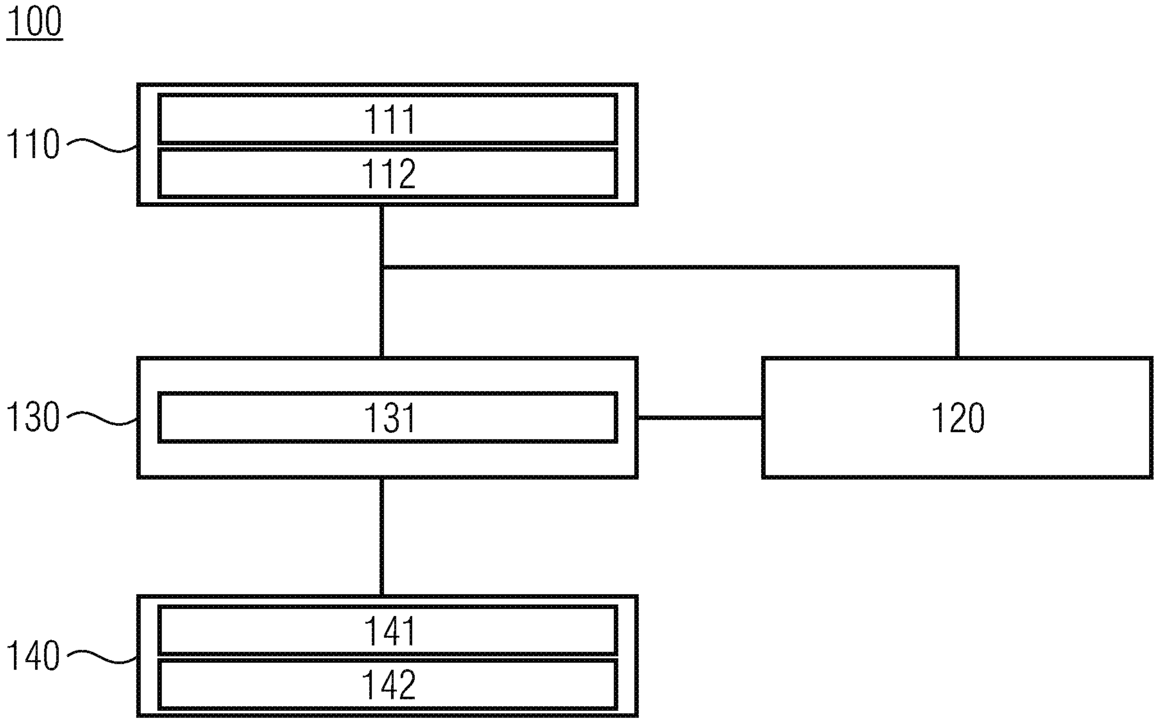
FIG. 1 shows a schematic flowchart of the method according to embodiments.

FIG. 1 shows a schematic flowchart of an embodiment of the presented technique. Method 100 is described in the following in more detail.

Method 100 starts with step 110, which is the segmentation step. Segmentation step 110 segments each audio signal 210, . . . , 250 into segments.

Figure 2:
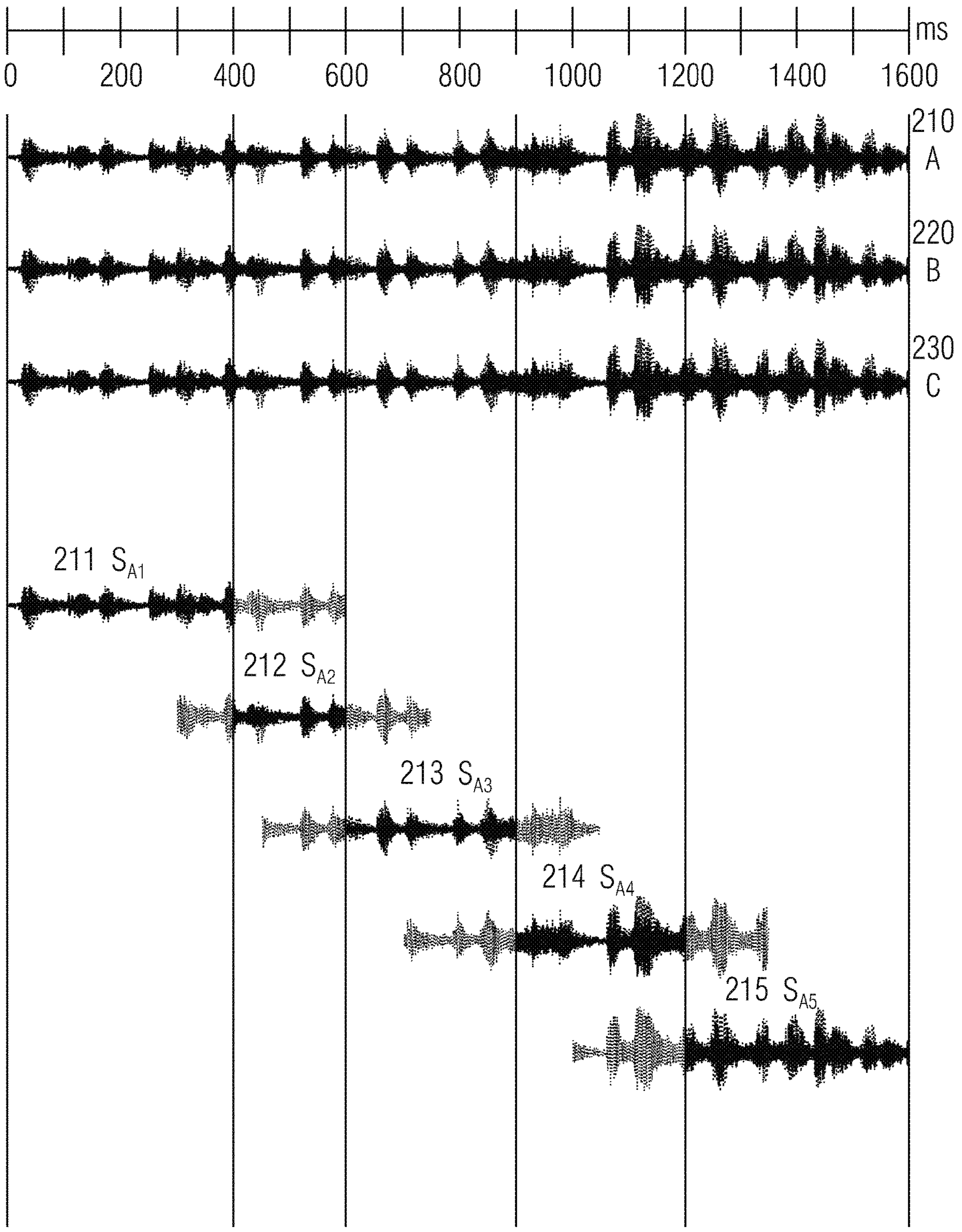
FIG. 2 shows a schematic representation of segmenting audio signals according to embodiments.

FIG. 2 shows symbolically three such measurements 210, 220, and 230, in the following also referred to as audio signals A, B, and C. As indicated before, more than three measurements are also possible, even if not depicted in the figures.

Segmentation step 110 comprises dissecting each audio signal into a plurality of audio signal segments. As an example, FIG. 2 shows that audio signal A 210 is dissected into segments $S_{A1}, \ldots S_{A5}$, which are also referred to by the reference signs 211, . . . 215.

Each audio signal is dissected in sub-step 111 such that each segment of the audio signal overlaps with adjacent segments a predetermined percentage of the segment length. Of course, the first and last segment can only overlap unilaterally.

All audio signals are dissected in the same way, that is, the same segmentation is used for all audio signals, such that all dissected audio signals have corresponding segment borders, that is, each $1^{st}$, $2^{nd}$, . . . , $n^{th}$ segment of all audio signals have the same length, the same start time and the same end time. The corresponding segment borders are shown in FIG. 2 at 0, 400, 600, 900, 1200, and 1600 ms and are indicated by the vertical lines over audio signals 210, 220, 230 and audio signal segments 211, 212, 213, 214, and 215.

Optionally, each of the audio signals is dissected using the same length for all segments. If this is applied, $S_{A1}$ through $S_{A5}$ would be of the same length. This is not depicted in the figures. Since all audio signals are dissected similarly, thereby all segments of all audio signals have the same length. That means, if an analogue denomination is used for the other audio signals, B and C, $S_{B1}$ through $S_{B5}$ and $S_{C1}$ through $S_{C5}$ would then have the same length as $S_{A1}$ through $S_{A5}$. $S_{B1}, \ldots, S_{B5}, S_{C1}, \ldots S_{C5}$ are not shown in the Figures.

Optionally, the segments of each audio signal can have the same overlap percentage. FIG. 2 already shows this for the easy of description, namely 50% overlap. For instance, segment $S_{A2}$ has a length of 200 ms. The depicted overlap of 50% means that 50% of the length overlap with $S_{A1}$ and that 50% of the length overlap with $S_{A3}$. In the depicted case, the overlap to either side is thus 100 ms or 0.1 seconds. Overlap percentages other than 50% can be used as well.

Either the same overlap percentage is used for all segments of all audio signals. Or the same overlap percentage is used for each $n^{th}$ segment of all audio signals. As an example, $S_{A1}$, $S_{B1}$, and $S_{C1}$ (in short $S_{X1}$) could have 35% overlap, $S_{A2}$, $S_{B2}$, and $S_{C2}$ (in short $S_{X2}$) could have 55% overlap, and so on . . . .

In sub-step 112 of the segmentation step 110 an analysis window function is applied to each of the audio signal segments. Thereby temporally weighted audio signal segments are produced.

As stated above, since all audio signals are dissected similarly, the analysis window function for the $n^{th}$ segment of each audio signal is the same. However, each segment within an audio signal can have an individual analysis window function. That means, segments $S_{X1}$ can have a different analysis window function than segments $S_{X2}$. And so on. Optionally, the analysis window function for some or all segments of one audio signal (and thus for the corresponding segments in the other audio signals) can be the same.

Further, the analysis window function can be a cosine function. Alternatively, the analysis window function can be a square root of a constant-overlap-add property window function, and other window function can be used as well. Constant-overlap-add is also referred to as COLA.

A COLA window is a window function w(t) which fulfills the COLA constraint in equation (1), where $T_S$ denotes the frame shift of the periodically applied window.

$$\Sigma_{k=-\infty}^{\infty} w(t-kT_S)=1 \quad (1)$$

A function which fulfills this constraint is the rectangular window of length $T_S$, as can be seen in equations (2) and 3.

$$r_S(t)=\mathrm{rect}(t/T_S) \quad (2)$$

$$rect(t) = \begin{cases} 1, \text{ if } t \in \left]-\frac{1}{2}, \frac{1}{2}\right] \\ 0, \text{ else} \end{cases} \quad (3)$$

Returning to the method, by segmentation step 110, and in particular by sub-step 112, each segment is transformed into a temporally weighted audio signal segment.

In other words, the segmentation dissects each repeated recording into overlapping segments and applies a window function. In one embodiment a cosine window is used as window function. 50% overlap is an advantageous embodiment. In order to have time-aligned processing, the same segmentation is used for all repeated measurements.

In determination step 120, a weight value for each of the temporally weighted audio signal segments is determined. This can also be done individually for each segment of each audio signal.

As one option, the weight values for the segments are determined on the basis of determining a noise variance estimate value for each of the temporally weighted audio signal segments.

In more detail, each segment can be modeled as $x_n(t)=s(t)+n_n(t)$ where s(t) denotes the clean signal and $n_n(t)$ denotes the additive Gaussian noise of the $n^{th}$ repetition. It can be assumed that the noise signals are statistically independent. Hence, for any pair <i,j> of repetitions the computation of the variance $\sigma_{i,j}^2$ of the difference signal results in equation (4) for the two involved variance estimates $\hat{\sigma}_i^2$ and $\hat{\sigma}_j^2$.

$$\hat{\sigma}_i^2+\hat{\sigma}_j^2=\sigma_{i,j}^2 \quad (4)$$

In order to determine these estimates, a linear equation system can be constructed according to equation (5).

$$Av=b \quad (5)$$

Therein, the pair matrix A is constructed according to the following pseudo code:

```
A=zeros(M,N)
k=0
for i=1 . . . N−1
  for j=i+1 . . . N
    k=k+1
    A(k,i)=1
    A(k,j)=1
  end
end
```

Therein, N denotes the number of repetitions and M=N(N−1)/2 denotes the number of pairs. Vector b on the right-hand side of the linear equation system (5) contains the variances $\sigma_{i,j}{}^2$ and is constructed according to the following pseudo code:

```
b=zeros(M,1)
k=0
for i=1 . . . N−1
  for j=i+1 . . . N
    k=k+1
    b(k)=E{|x_i(t)−x_j(t)|^2}
  end
end
```

Vector $$v=[\hat{\sigma}_1^2, \ldots, \hat{\sigma}_N^2]^T$$

contains the unknown variance estimates. Since the linear equation system is over-determined, the Moore-Penrose inverse $A^+=(A^TA)^{-1}A^T$ can be used to determine the variance estimates in the minimum mean square error sense according to equation (6).

$$v=A^+b \quad (6)$$

Alternatively, the weight values for the segments are determined on the basis of calculating a root mean square value of a corresponding difference signal for each of the temporally weighted audio signal segments. The difference signal is determined as in the example described, only that the root is extracted and the calculation is continued after that.

Method 100 then proceeds with the combining step 130, which combines the temporally weighted audio signal segments of each audio signal. This is done individually for each audio signal. The temporally weighted audio signal segments are combined by calculating, in sub-step 131, a weighted average of all temporally weighted audio signal segments of each audio signal, using the determined weight value of each temporally weighted audio signal segment.

Each repeated segment is optimally combined to the de-noised segment y(t) by a weighted average according to equation (7).

$$y(t)=\Sigma_{n=1}^{N}w_nx_n(t) \quad (7)$$

Therein the weights $w_n$ for the current segment can be derived, as discussed as one option above, directly from the noise variance estimates for this segment, according to equation (8).

$$w_n=\frac{1/\hat{\sigma}_n^2}{\sum_{k=1}^{N}1/\hat{\sigma}_k^2} \quad (8)$$

As discussed above, alternative, the weights can be determined on the basis of calculating a root mean square value of a corresponding difference signal for each of the temporally weighted audio signal segments.

After the individual audio signals 210, . . . , 250 are re-combined from the modified segments, an output signal 260 is generated in generation step 140. Therein the output audio signal is generated by applying a synthesis window function to the combined segments of each audio signal in sub-step 141. After that, in sub-step 142, an overlap-add method is performed on the corresponding results of the synthesis window function. Thereby the output audio signal is generated.

Similar to the description of the analysis window function, since all audio signals are dissected similarly, the synthesis window function is also applied similarly for all audio signals. That means, for the $n^{th}$ segment of each audio signal the synthesis window function is the same.

However, each segment within an audio signal can have an individual analysis window function, and therefore also an individual synthesis window function. That means, segments $S_{X1}$ can have a different synthesis window function than segments $S_{X2}$. And so on. Optionally, the synthesis window function for some or all segments of one audio signal (and thus for the corresponding segments in the other audio signals) can be the same.

Further, the synthesis window function can be a cosine function. Alternatively, the synthesis window function can be a square root of a constant-overlap-add property window function, and other window function can be used as well.

In general terms, onto each segment $S_{XY}$ an analysis window function $A_{XY}$ is applied in segmentation step 110. In generation step 140 onto each segment $S_{XY}$ a synthesis window function $SY_{XY}$ is applied. As detailed above, all $n^{th}$ segments $S_{X1}$ will have the same analysis window function and thus the same synthesis window function as well.

However, the analysis window function and the synthesis window function $A_{XY}$ and $SY_{XY}$ can also be the same window function for some or all of the segments.

Finally, some or all of the window function pairs analysis window function and the synthesis window function $A_{XY}$ and $SY_{XY}$ can be chosen such that the product of the analysis window function and the synthesis window function satisfies the constant-overlap-add property.

This is also satisfied, by example, by using a Hann or Hamming window as the analysis window, and no synthesis window, or to be more exact to use an identity function as the synthesis window.

In other words, the final output signal 260 is generated by applying a synthesis window to the combined signal segments y(t) and performing an overlap-add method. In an advantageous embodiment, a cosine window is used in the segmentation step, and the same window function is used again in the generation step to achieve constant overlap add property.

Figure 3:
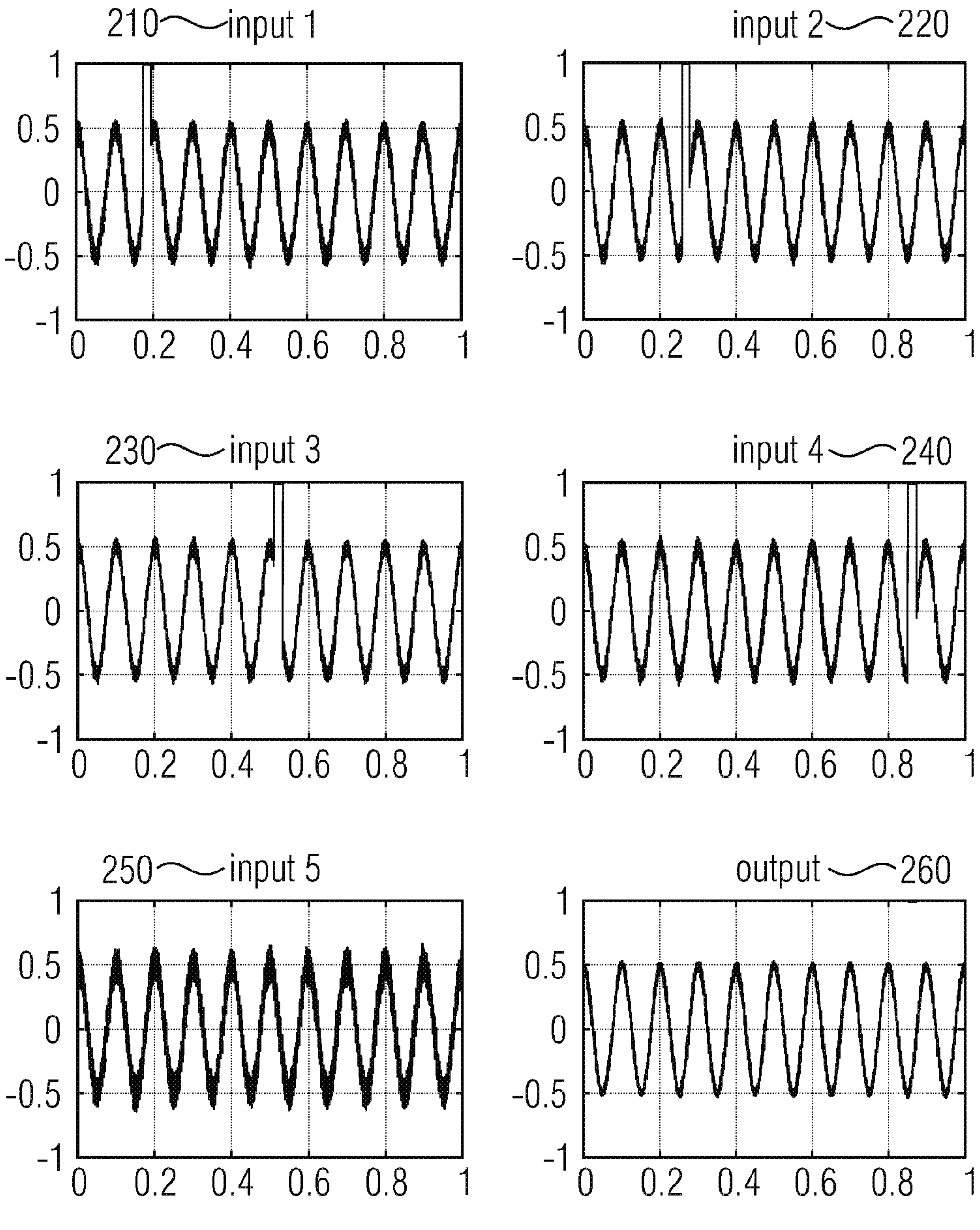
FIG. 3 shows schematic input and output audio signals according to embodiments.

FIG. 3 shows an example according to embodiments of the presented technique with 5 repetitions, i.e. audio signals, which can for example be simulated recordings. The audio signals contain as an example non-stationary signal degradation, shown in inputs 1 through 4, 210, . . . 240, and different noise levels, shown in input 5 250. Output signal 260 is shown as the result. Each of the signals are shown with the x-axis indicating time in seconds, and the y-axis indicating x(t).

Figure 4:
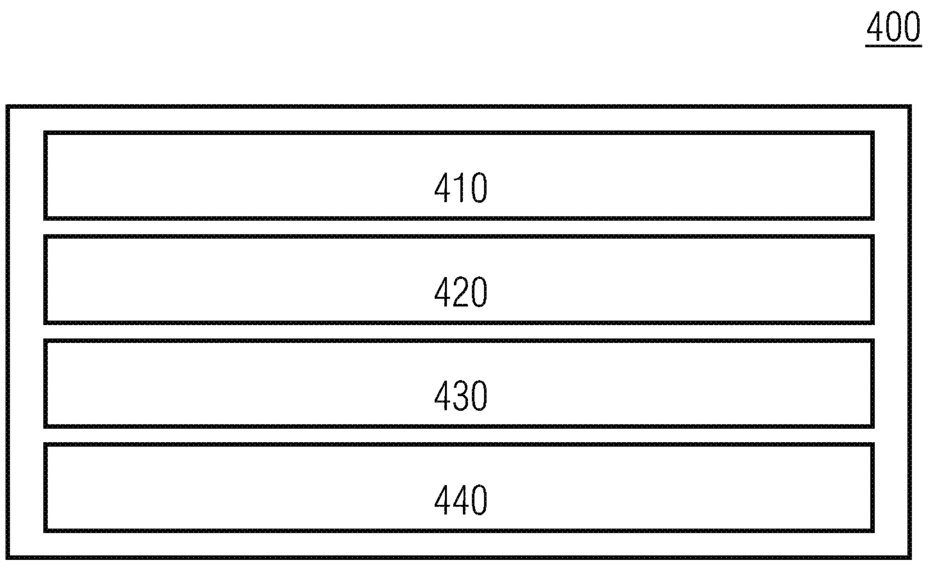
FIG. 4 shows a schematic illustration of an apparatus according to embodiments.

FIG. 4 shows an apparatus 400 for combining three or more audio signals 210, . . . , 250. These audio signals 210, . . . , 250 are for example repeated measurements of a sound system. The apparatus comprises a segmentation block 410. The segmentation block 410 segments or dissects each audio signal 210, . . . , 250 into a plurality of segments 211, . . . , 215. The dissection is performed such that each segment overlaps with adjacent segments a predetermined percentage of the segment length. Of course, the first and last segment can only overlap unilaterally. The same segmentation is used for all audio signals, such that all dissected audio signals have corresponding segment borders, that is, each $1^{st}$, $2^{nd}$, . . . , $n^{th}$ segment of all audio signals have the same length, the same start time and the same end time. The segmentation block further is configured to apply an analysis window function to each of the audio signal segments. This can be performed for each segment of each audio signal individually. Thereby, each segment is transformed into a temporally weighted audio signal segment.

The apparatus further comprises a weight determination block 420, which is configured to determine a weight value for each of the temporally weighted audio signal segments. This can also be done individually for each segment of each audio signal.

The apparatus further comprises a combination block 430 for combining the temporally weighted audio signal segments of each audio signal. This can be done individually for each audio signal. The combination is performed by calculating a weighted average of all temporally weighted audio signal segments of each audio signal, using the determined weight value of each temporally weighted audio signal segment.

The apparatus also comprises a synthesis block 440 for generating an output audio signal. The synthesis block is configured to apply a synthesis window function to the combined segments of each audio signal, and to perform an overlap-add method on the corresponding results of the synthesis window function. Thereby the output audio signal is generated.

Figure 5:
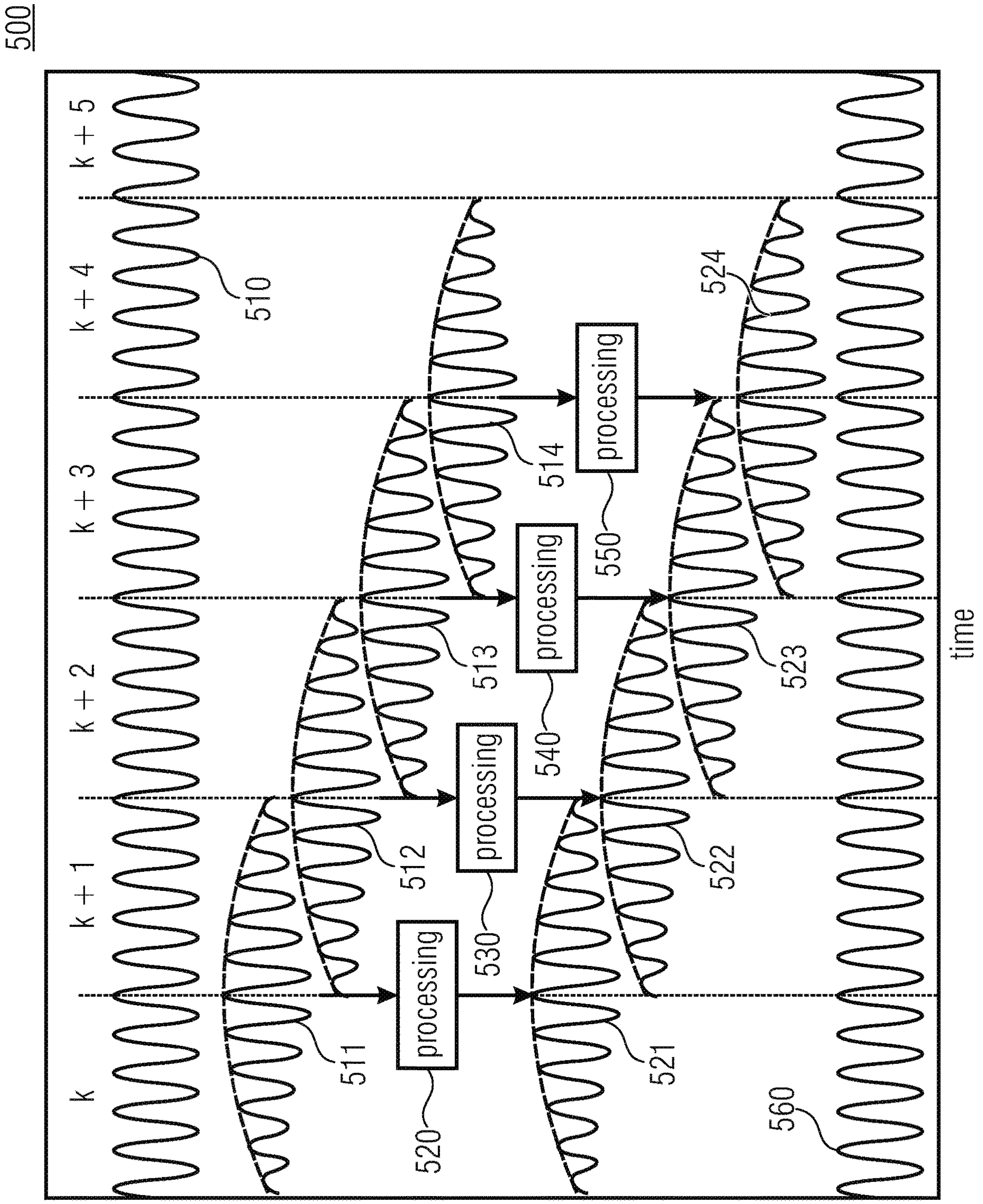
FIG. 5 shows a schematic illustration of combining segments into an output signal.

FIG. 5 shows an example of the effects the method has on an audio signal 510. First audio signal 510 is dissected (sub-step 111 of above) into segments, starting with k. The segments are referred to by 511, . . . , 514, and the segments overlap as is shown schematically with an overlap of 50%. Then an analysis window function is applied (sub-step 112 of above) in 520, . . . , 550 to each of the audio signal segments to produce temporally weighted audio signal segments 521, . . . , 524. These temporally weighted audio signal segments 521, . . . , 524 are then combined again using the weights which have been determined (step 120 of above) in the meantime or before the combining, to form the processed audio signal 560.

If every audio signal has been processed in this manner, the processed audio signals are then combined again (step 130 of above, not shown in FIG. 5) to form the output signal.

Above described method and apparatus can be used for calibrating sound systems.

In summary, the presented technique takes repeated audio signals, like exponential sweep measurements which are repeated a few times (at least 3 times), and as one embodiment consecutively estimates short-term variances $\hat{\sigma}_n^2$ of the additive noise for each repetition. The time-varying variance estimates are then used to combine the repeated measurements in a minimum mean square error sense using a weighted average.

It is advantageous, if one (or more) of the repeated audio signals, i.e. sweep recordings, exhibits significantly greater noise variance than other recordings at a given time, then a significantly smaller weight will be used for this (these) signal segment. As a consequence, the presented method can deal very well with non-stationary noise. FIG. 3 illustrates this.

In contrast to this presented technique, conventional methods cannot deal very well with non-stationary noise. If the recorded sweep contained some unexpected background noise, the measurement had to be done again.

To conclude, the embodiments described herein can optionally be supplemented by any of the important points or aspects described here. However, it is noted that the important points and aspects described here can either be used individually or in combination and can be introduced into any of the embodiments described herein, both individually and in combination.

Although some aspects have been described in the context of an apparatus, it is clear that these aspects also represent a description of the corresponding method, where a device or a part thereof corresponds to a method step or a feature of a method step. Analogously, aspects described in the context of a method step also represent a description of a corresponding apparatus or part of an apparatus or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any parts of the methods described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Apparatus for combining three or more audio signals, the apparatus comprising:

a segmentation block for segmenting each audio signal, which is configured to dissect each audio signal into a plurality of audio signal segments, each audio signal segment overlapping with adjacent audio signal segments a predetermined percentage of the audio signal segment length, wherein all dissected audio signals comprise corresponding audio signal segment borders, such that each $1^{st}$, 2nd, . . . , $n^{th}$ audio signal segment of all audio signals comprise the same length, the same start time and the same end time, and to apply an analysis window function to each of the audio signal segments to produce temporally weighted audio signal segments, a weight determination block, which is configured to determine a weight value for each of the temporally weighted audio signal segments, a combination block for combining the temporally weighted audio signal segments of each audio signal, which is configured to calculate a weighted average of all temporally weighted audio signal segments of each audio signal, using the determined weight value of each temporally weighted audio signal segment, and a synthesis block for generating an output audio signal, which is configured to apply a synthesis window function to the combined temporally weighted audio signal segments of each audio signal, and to perform an overlap-add method on the corresponding results of the synthesis window function.

2. Apparatus according to claim 1, wherein the weight determination block is configured to determine the weight values for the temporally weighted audio signal segments on the basis of a determination of a noise variance estimate value for each of the temporally weighted audio signal segments, or a calculation of a root mean square value of a corresponding difference signal for each of the temporally weighted audio signal segments.

3. Apparatus according to claim 1, wherein the three or more audio signals are measurements for loudspeaker calibration, preferably one of sweep measurements, in particular preferably exponential sweep measurements, measurements using Maximum Length Sequences, and measurements using acoustic signals, in particular preferably measurements using music.

4. Apparatus according to claim 1, wherein for each audio signal, all audio signal segments comprise the same length, all audio signal segments comprise the same overlap percentage, and/or the same analysis window function is applied to all audio signal segments.

5. Apparatus according to claim 1, wherein the overlap percentage is 50 percent, the analysis window function and/or the synthesis window function is one of a cosine function or the square root of any window function with constant-overlap-add property, and/or the analysis window function and the synthesis window function are the same window function.

6. Apparatus according to claim 1, wherein the product of the analysis window function and the synthesis window function satisfies the constant-overlap-add property.

7. Apparatus according to claim 1 for calibration of sound systems.

8. Method for combining three or more audio signals, comprising:

segmenting each audio signal, comprising dissecting each audio signal into a plurality of audio signal segments, each audio signal segment overlapping with adjacent audio signal segments a predetermined percentage of the audio signal segment length, wherein all dissected audio signals comprise corresponding audio signal segment borders, such that each $1^{st}$, 2nd, . . . , $n^{th}$ audio signal segment of all audio signals comprise the same length, the same start time and the same end time, and applying an analysis window function to each of the audio signal segments to produce temporally weighted audio signal segments, determining a weight value for each of the temporally weighted audio signal segments, combining the temporally weighted audio signal segments of each audio signal, comprising calculating a weighted average of all temporally weighted audio signal segments of each audio signal, using the determined weight value of each temporally weighted audio signal segment, and generating an output audio signal, comprising applying a synthesis window function to the combined temporally weighted audio signal segments of each audio signal, and performing an overlap-add method on the corresponding results of the synthesis window function.

9. Method according to claim 8, wherein the weight values for the temporally weighted audio signal segments are determined on the basis of determining a noise variance estimate value for each of the temporally weighted audio signal segments, or calculating a root mean square value of a corresponding difference signal for each of the temporally weighted audio signal segments.

10. Method according to claim 8, wherein the three or more audio signals are measurements for loudspeaker calibration, preferably one of sweep measurements, in particular preferably exponential sweep measurements, measurements using Maximum Length Sequences, and/or measurements using acoustic signals, in particular preferably measurements using music.

11. Method according to claim 8, wherein for each audio signal dissecting is performed using the same length and/or the same overlap percentage for all audio signal segments, and/or the same analysis window function is applied to all audio signal segments.

12. Method according to claim 8, wherein dissecting is performed using an overlap percentage of 50 percent, the analysis window function and/or the synthesis window function is one of a cosine function or the square root of any window function with constant-overlap-add property, and/or the analysis window function and the synthesis window function are the same window function.

13. Method according to claim 8, wherein the product of the analysis window function and the synthesis window function satisfies the constant-overlap-add property.

14. Using the method according to claim 8 for calibrating sound systems.

15. A non-transitory digital storage medium having a computer program stored thereon to perform the method for combining three or more audio signals, comprising:

segmenting each audio signal, comprising dissecting each audio signal into a plurality of audio signal segments, each audio signal segment overlapping with adjacent audio signal segments a predetermined percentage of the audio signal segment length, wherein all dissected audio signals comprise corresponding audio signal segment borders, such that each $1^{st}$, 2nd, . . . , $n^{th}$ audio signal segment of all audio signals comprise the same length, the same start time and the same end time, and applying an analysis window function to each of the audio signal segments to produce temporally weighted audio signal segments, determining a weight value for each of the temporally weighted audio signal segments, combining the temporally weighted audio signal segments of each audio signal, comprising calculating a weighted average of all temporally weighted audio signal segments of each audio signal, using the determined weight value of each temporally weighted audio signal segment, and generating an output audio signal, comprising applying a synthesis window function to the combined temporally weighted audio signal segments of each audio signal, and performing an overlap-add method on the corresponding results of the synthesis window function, when said computer program is run by a computer.

* * * * *